United States Patent
Heitman et al.

(10) Patent No.: US 10,132,197 B2
(45) Date of Patent: Nov. 20, 2018

(54) SHROUD ASSEMBLY AND SHROUD FOR GAS TURBINE ENGINE

(71) Applicant: General Electric Company, Schenectady, NY (US)

(72) Inventors: Bryce Loring Heitman, Cincinnati, OH (US); Michael Todd Radwanski, Newport, KY (US); Darrell Glenn Senile, Oxford, OH (US)

(73) Assignee: General Electric Company, Schenectady, NY (US)

( * ) Notice: Subject to any disclaimer, the term of this patent is extended or adjusted under 35 U.S.C. 154(b) by 440 days.

(21) Appl. No.: 14/690,544

(22) Filed: Apr. 20, 2015

(65) Prior Publication Data

US 2016/0305286 A1    Oct. 20, 2016

(51) Int. Cl.
*F01D 25/24*  (2006.01)
*F01D 5/02*   (2006.01)
(Continued)

(52) U.S. Cl.
CPC ............. *F01D 25/246* (2013.01); *F01D 5/02* (2013.01); *F01D 9/04* (2013.01); *F01D 11/005* (2013.01); *F01D 25/24* (2013.01); *F01D 25/243* (2013.01); *F02C 3/04* (2013.01); *F02C 7/20* (2013.01); *F05D 2220/32* (2013.01);
(Continued)

(58) Field of Classification Search
CPC ...... F01D 25/24; F01D 25/243; F01D 25/246; F01D 25/28; F01D 11/005; F01D 9/04; F02C 7/20; F05D 2240/11; F05D 2240/91; F05D 2260/30

See application file for complete search history.

(56) References Cited

U.S. PATENT DOCUMENTS 3,844,115 A    10/1974  Freid et al.
4,512,712 A    4/1985   Baran, Jr. et al.
(Continued)

FOREIGN PATENT DOCUMENTS

CN    101372902 A    2/2009
GB    2484188 A      4/2012
(Continued)

OTHER PUBLICATIONS

European Search Report and Opinion issued in connection with corresponding EP Application No. 16165212.8 dated Aug. 26, 2016.
(Continued)

*Primary Examiner* — Carlos A Rivera
*Assistant Examiner* — Kyle Thomas
(74) *Attorney, Agent, or Firm* — General Electric Company; William Andes

(57) ABSTRACT

Shrouds and shroud assemblies for gas turbine engines are provided. A shroud includes a shroud body. The shroud body includes a forward surface, a rear surface axially spaced from the forward surface, an inner surface extending between the forward surface and the rear surface, and an outer surface extending between the forward surface and the rear surface and radially spaced from the inner surface. The shroud further includes a flange extending from the shroud body, and a bore hole defined in the flange. The bore hole extends generally circumferentially through the flange between a first opening and a second opening.

11 Claims, 6 Drawing Sheets

(51) Int. Cl.
*F01D 9/04* (2006.01)
*F02C 3/04* (2006.01)
*F01D 11/00* (2006.01)
*F02C 7/20* (2006.01)

(52) U.S. Cl.
CPC ...... *F05D 2230/60* (2013.01); *F05D 2240/11* (2013.01); *F05D 2240/35* (2013.01); *F05D 2240/55* (2013.01); *F05D 2240/91* (2013.01); *F05D 2260/30* (2013.01); *F05D 2300/10* (2013.01); *F05D 2300/6033* (2013.01)

(56) References Cited

U.S. PATENT DOCUMENTS

| | | | |
|---|---|---|---|
| 5,330,321 | A | 7/1994 | Roberts et al. |
| 6,821,085 | B2 | 11/2004 | Darkins, Jr. et al. |
| 6,884,026 | B2 | 4/2005 | Glynn et al. |
| 2004/0047726 | A1* | 3/2004 | Morrison ............... F01D 9/04 415/116 |
| 2006/0087293 | A1 | 4/2006 | Xu et al. |
| 2007/0031258 | A1* | 2/2007 | Campbell ............... F01D 9/04 416/189 |
| 2010/0150703 | A1 | 6/2010 | Gonzalez et al. |
| 2012/0260670 | A1* | 10/2012 | Foster ............... F01D 25/246 60/798 |
| 2013/0277454 | A1 | 10/2013 | Hurlin et al. |
| 2014/0271147 | A1* | 9/2014 | Uskert ............... F01D 11/24 415/173.2 |
| 2015/0377035 | A1* | 12/2015 | Freeman ............... F01D 11/12 416/191 |

FOREIGN PATENT DOCUMENTS

| | | |
|---|---|---|
| JP | H08-35401 A | 2/1996 |
| JP | 2005-009479 A | 1/2005 |
| JP | 2009-041568 A | 2/2009 |
| JP | 2009-108855 A | 5/2009 |

OTHER PUBLICATIONS

First Office Action and Search issued in connection with corresponding CN Application No. 201610245931.7 dated Apr. 18, 2017.
Notification of Reasons for Refusal issued in connection with corresponding JP Application No. 2016-079226 dated May 9, 2017.
Machine translation of Second Office Action issued in connection with corresponding CN Application No. 201610245931.7 dated Oct. 20, 2017.

* cited by examiner

SHROUD ASSEMBLY AND SHROUD FOR GAS TURBINE ENGINE

FIELD OF THE INVENTION

The present subject matter relates generally to a shroud assemblies and shrouds for gas turbine engines. More particularly, the present subject matter relates to improved apparatus for coupling the various components of shroud assemblies in gas turbine engines.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds and engine frames. The rotatable and the stationary turbine components at least partially define the hot gas path through the turbine section. As the combustion gases flow through the hot gas path, thermal energy is transferred from the combustion gases to the rotatable turbine components and the stationary turbine components.

In general, the HP turbine and LP turbine may additionally include shroud assemblies which further define the hot gas path. A clearance gap may be defined between the shroud of a shroud assembly and the rotatable turbine components of an associated stage of rotatable turbine components. The shroud is typically retained within the gas turbine engine by a shroud hanger, which in turn is coupled to various other components of the engine.

One issue with presently known shroud assemblies is the loads experienced by the shrouds during operation of the engine. Known "open" style shrouds include flanges at the forward and rear ends for coupling the shroud to the hanger. The flanges have axially extending bore holes defined herein, and pins are extended through the bore holes and mating components of the hanger to couple the shroud and hanger together. Because the flanges are on the forward and rear ends of the shroud, they are "pinched" between mating components of the hanger. This "pinching", and the general orientation of the flanges, can cause increased loading experienced by the shrouds during operation. Further, thermal stresses can be experienced due to higher temperatures in the hot gas path travelling through these flanges to cooler areas outside of the hot gas path. Still further, leakages in the hot gas path seal that the shroud assemblies provide can occur. Such issues are of increased concern when the shrouds are formed from ceramic matrix composite materials.

Accordingly, improved shrouds and shroud assemblies for gas turbine engines are desired. For example, shrouds and shroud assemblies with improved apparatus for coupling the shrouds to hangers of the shroud assemblies, and which reduce loading issues, thermal stress issues, and leakage issues, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a shroud assembly for a gas turbine engine is provided. The shroud assembly includes a hanger and a shroud. The hanger includes a forward hanger arm, a rear hanger arm axially spaced from the forward hanger arm, a hanger body extending between the forward hanger arm and the rear hanger arm, and a flange housing extending from the hanger body. The hanger further includes a bore hole extending generally circumferentially through the flange housing between a first opening and a second opening. The shroud includes a shroud body and a flange extending from the shroud body. The shroud further includes a bore hole defined in the flange, the bore hole extending generally circumferentially through the flange between a first opening and a second opening. The flange is generally disposed within the flange housing. The shroud assembly further includes a pin extending generally circumferentially through the bore hole of the hanger and the bore hole of the shroud.

In accordance with another embodiment of the present disclosure, a shroud for a gas turbine engine is provided. The shroud includes a shroud body. The shroud body includes a forward surface, a rear surface axially spaced from the forward surface, an inner surface extending between the forward surface and the rear surface, and an outer surface extending between the forward surface and the rear surface and radially spaced from the inner surface. The shroud further includes a flange extending from the shroud body, and a bore hole defined in the flange. The bore hole extends generally circumferentially through the flange between a first opening and a second opening.

In accordance with another embodiment of the present disclosure, a gas turbine engine is provided. The gas turbine engine includes a compressor, a combustion section, a turbine, and a shroud assembly disposed in one of the compressor or the turbine. The shroud assembly includes a hanger and a shroud. The hanger includes a forward hanger arm, a rear hanger arm axially spaced from the forward hanger arm, a hanger body extending between the forward hanger arm and the rear hanger arm, and a flange housing extending from the hanger body. The hanger further includes a bore hole extending generally circumferentially through the flange housing between a first opening and a second opening. The shroud includes a shroud body and a flange extending from the shroud body. The shroud further includes a bore hole defined in the flange, the bore hole extending generally circumferentially through the flange between a first opening and a second opening. The flange is generally disposed within the flange housing. The shroud assembly further includes a pin extending generally circumferentially through the bore hole of the hanger and the bore hole of the shroud.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
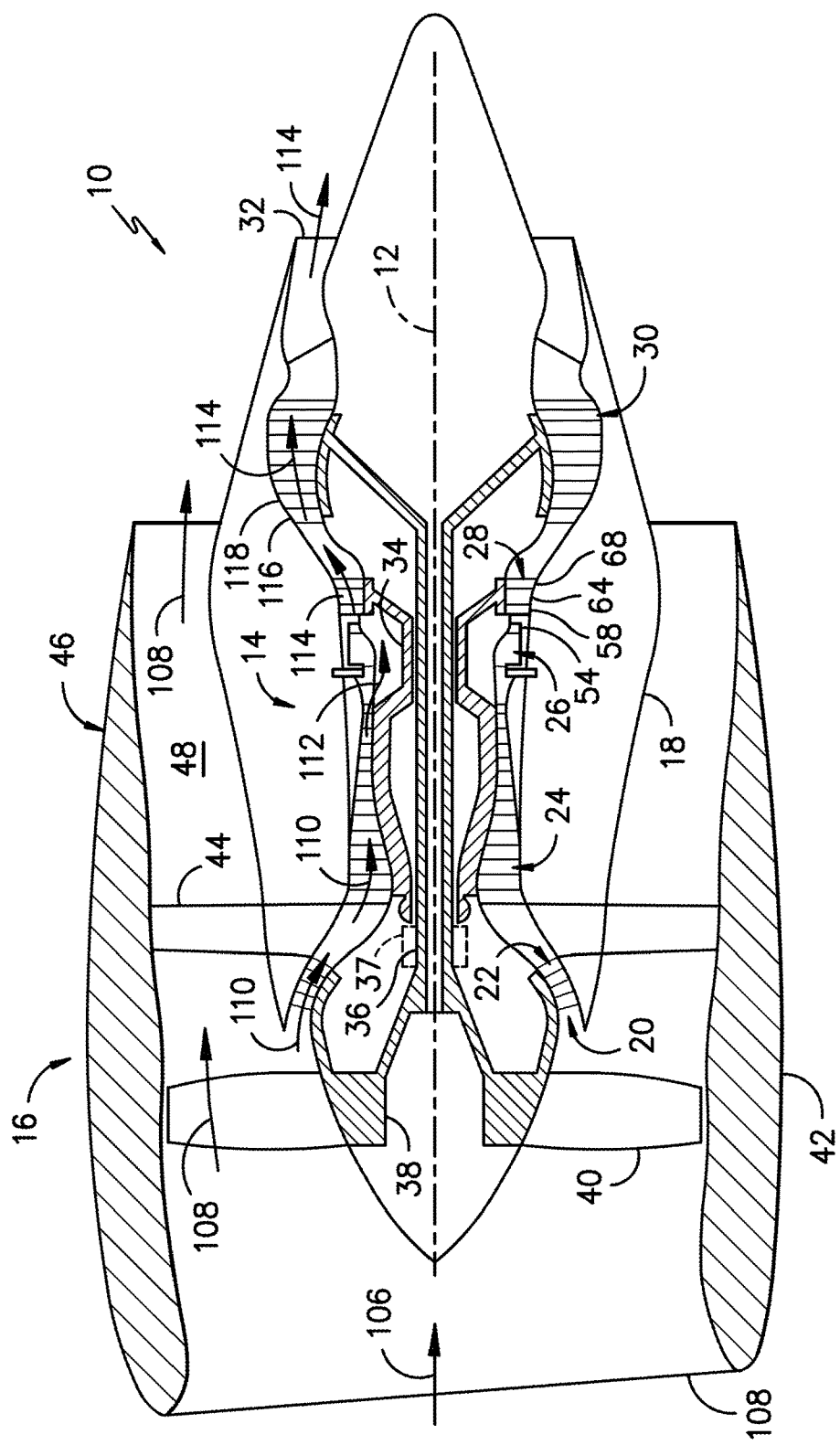
FIG. 1 is a schematic cross-sectional view of a gas turbine engine in accordance with one embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

Referring now to the drawings, FIG. 1 is a schematic cross-sectional view of an exemplary high-bypass turbofan type engine 10 herein referred to as "turbofan 10" as may incorporate various embodiments of the present disclosure. As shown in FIG. 1, the turbofan 10 has a longitudinal or axial centerline axis 12 that extends therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, the (LP) spool 36 may be connected directly to the fan spool 38 such as in a direct-drive configuration. In alternative configurations, the (LP) spool 36 may be connected to the fan spool 38 via a speed reduction device 37 such as a reduction gear gearbox in an indirect-drive or geared-drive configuration. Such speed reduction devices may be included between any suitable shafts/spools within engine 10 as desired or required.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 (downstream of the guide vanes 44) may extend over an outer portion of the gas turbine engine 14 so as to define a bypass airflow passage 48 therebetween.

Figure 2:
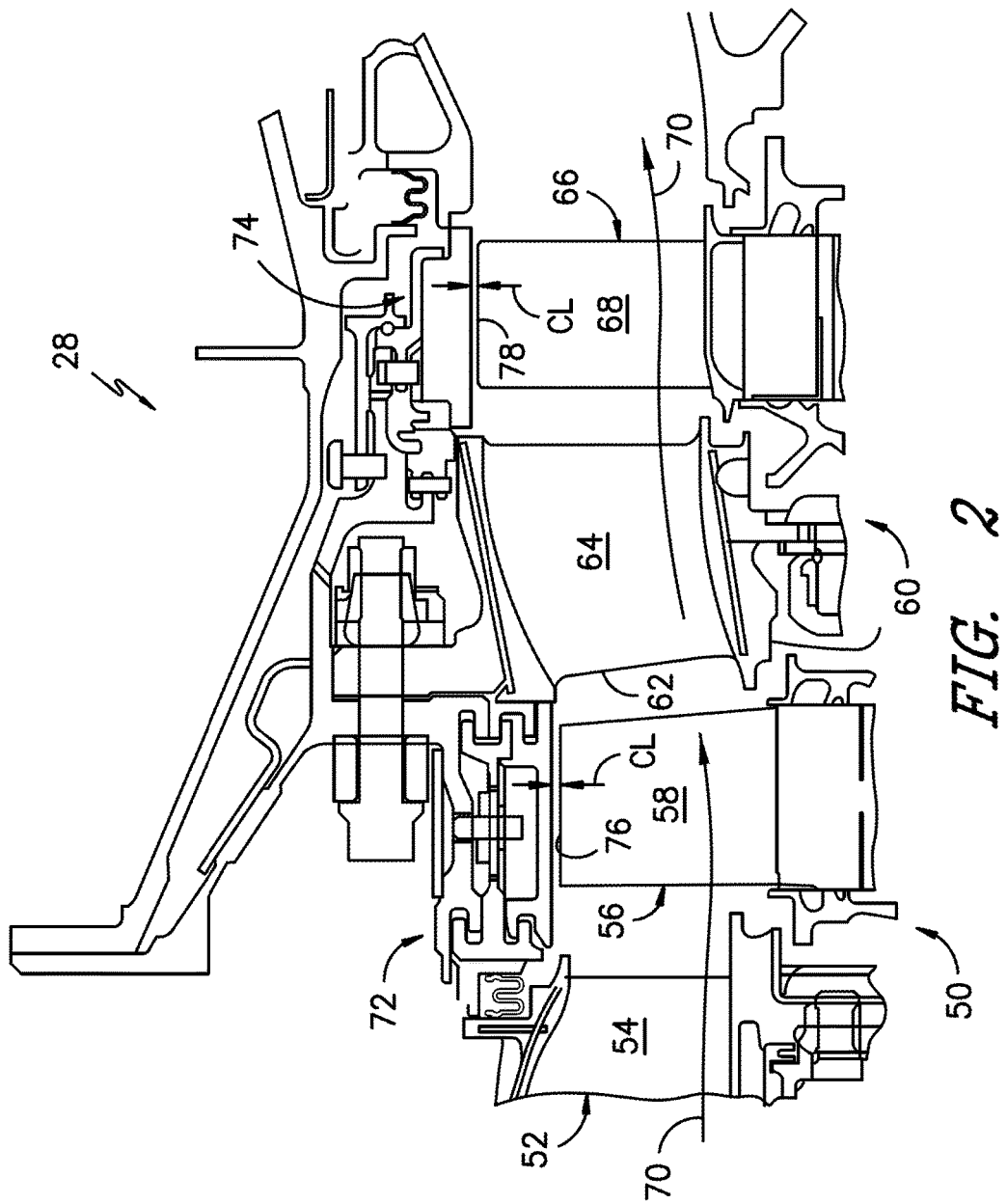
FIG. 2 is an enlarged cross sectional side view of a high pressure turbine portion of a gas turbine engine in accordance with one embodiment of the present disclosure.

FIG. 2 provides an enlarged cross sectioned view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes an annular array 52 of stator vanes 54 (only one shown) axially spaced from an annular array 56 of turbine rotor blades 58 (only one shown). The HP turbine 28 further includes a second stage 60 which includes an annular array 62 of stator vanes 64 (only one shown) axially spaced from an annular array 66 of turbine rotor blades 68 (only one shown). The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28.

As further shown in FIG. 2, the HP turbine may include one or more shroud assemblies, each of which forms an annular ring about an annular array of rotor blades. For example, a shroud assembly 72 may form an annular ring around the annular array 56 of rotor blades 58 of the first stage 50, and a shroud assembly 74 may form an annular ring around the annular array 66 of turbine rotor blades 68 of the second stage 60. In general, shrouds of the shroud assemblies 72, 74 are radially spaced from blade tips 76, 78 of each of the rotor blades 68. A radial or clearance gap CL is defined between the blade tips 76, 78 and the shrouds. The shrouds and shroud assemblies generally reduce leakage from the hot gas path 70.

It should be noted that shrouds and shroud assemblies may additionally be utilized in a similar manner in the low pressure compressor 22, high pressure compressor 24, and/or low pressure turbine 30. Accordingly, shrouds and shrouds assemblies as disclosed herein are not limited to use in HP turbines, and rather may be utilized in any suitable section of a gas turbine engine.

Referring now to FIGS. 3 through 6, improved shroud assemblies 100 and shrouds 102 therefor are disclosed. Shroud assemblies 100 as disclosed herein may be utilized in place of shroud assemblies 72, 74, as discussed above, or any other suitable shroud assemblies in an engine 10. Similarly, shrouds 102 as disclosed herein may be utilized in place of shrouds 76, 78, as discussed above, or any other suitable shrouds in an engine 10.

Shrouds 102 and shroud assemblies 100 in accordance with the present disclosure provide a number of advantages. In particular, shrouds 102 advantageously include flanges which have transversely extending bore holes, rather than previously known axially extending bore holes. Additionally, other components of the shroud assembly 100, such as hangers and baffles, may include similarly oriented flange components. The orientation of flanges and flange components in accordance with the present disclosure provides numerous disadvantages, especially in embodiments wherein the shroud 102 is formed form a ceramic matric composite ("CMC") material. For example, "pinching" of the shroud is avoided, and thermal stresses can be lessened. Further, seal members can be utilized with shrouds in accordance with the present disclosure to reduce hot gas path leakage.

Figure 5:
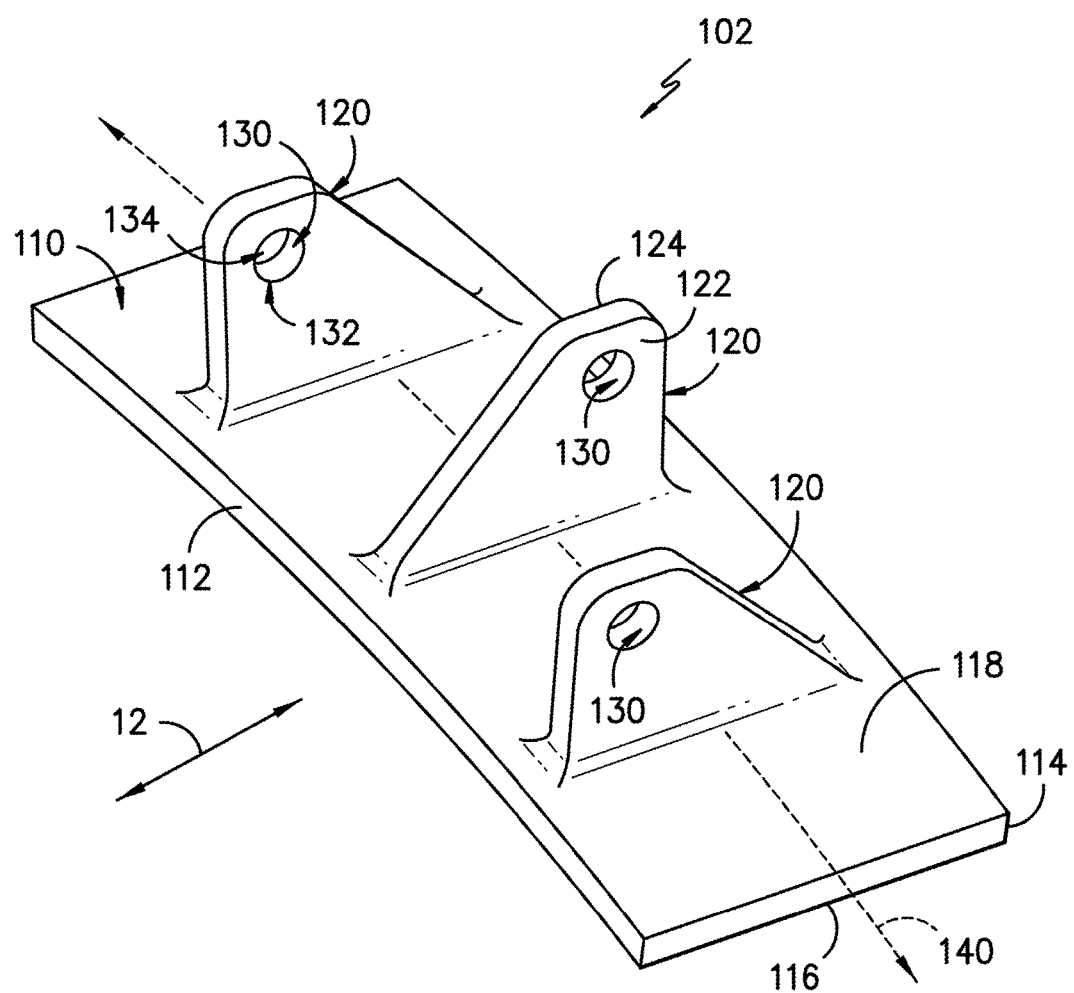
FIG. 5 is a perspective view of a shroud in accordance with one embodiment of the present disclosure.

An exemplary shroud 102 is illustrated in FIG. 5. A shroud 102 in accordance with the present disclosure may include, for example, a shroud body 110 and a flange 120 extending from the shroud body 110. In exemplary embodiments, the shroud body 110 and flange 120 (and shroud 102 in general) may be formed from a CMC material, although in alternative embodiments the shroud body 110 and flange 120 (and shroud 102 in general) may be formed from another suitable material such as a metal, etc. In particular, in exemplary embodiments, the flange 120 may be integral with shroud body 110 such that the flange 120 and shroud body 110 are generally a single component.

Shroud body 110 may include a forward surface 112 and a rear surface 114. The rear surface 114 is axially spaced from the forward surface 112, such as generally along the centerline 12 when in the engine 10. An inner surface 116 and an outer surface 118 may each extend between the forward surface 112 and the rear surface 114. The outer surface 118 is radially spaced from the inner surface 116. Inner surface 116 may, when the shroud 102 is in engine 10, be exposed to the hot gas path 70, while outer surface 118 is thus radially spaced from the hot gas path 70.

As mentioned, one or more flanges 120 may extend from the shroud body 110. Specifically, in exemplary embodiments, flanges 120 may extend from the outer surface 118 of the body 110. Each flange 120 may be generally axially oriented, as shown. Further, one or more bore holes 130 may be defined in each flange 120, and each bore hole 130 may extend generally circumferentially through the flange 120, such as between a first opening 132 and a second opening 134 of the bore hole 130. For example, the flange 120 may include a first surface 122 and a second surface 124, which may be side surfaces of the flange 120 through which the bore hole 130 extends. The second surface 124 may be generally circumferentially spaced from the first surface 122. First opening 132 may be defined in the first surface 122 and second opening 134 may be defined in the second surface 124.

Notably, the term "generally circumferential" or "generally circumferentially" refers to circumferential directions as well as directions that are angled from a circumferential direction by 5 degrees or less, such as 2 degrees or less, such as one degree or less. For example, at any point along the length of a generally circumferentially extending component, the component at that point may be angled from a circumferential direction by 5 degrees or less, such as 2 degrees or less, such as one degree or less. Further, a generally circumferentially extending component may extend linearly or curvilinearly within such angle range.

Shroud body 110 (and shroud assembly 100 generally) may further define a circumferentially extending centerline 140. Such centerline 140 extends circumferentially about centerline 12 when shroud 102 is in the engine 10. Further, centerline 140 may extend through a point axially halfway between the forward surface 112 and the rear surface 114 of the shroud body 110.

In some embodiments, one or more of the bore holes 130 may be aligned with the centerline 140, such that the centerline 140 generally passes through the center of the bore hole 130. In exemplary embodiments, however, one or more bore holes 130 may be axially offset from the centerline 140. For example, in some embodiments, a bore hole 130 may be axially offset towards the forward surface 112 of the shroud body 110, while in other embodiments a bore hole 130 may be axially offset towards the rear surface 114 of the shroud body 110. In particular exemplary embodiments wherein a plurality of flanges 120 are utilized, as shown, each bore hole 130 of each flange 120 may be axially offset from the centerline 140. Further, in exemplary embodiments, at least one or more of the plurality of bore holes 130 is axially offset towards the forward surface 112 and at least one or more of the plurality of bore holes 130 is axially offset towards the rear surface 114. For example, the offsets of the generally circumferentially neighboring flanges 130 may alternate between the forward offset and rear offset. Such offset of the bore holes 130 may advantageously reduce undesirable movement and imbalance of the shroud 102 due to hot gasses in the hot gas path 70 and resulting differential pressures on various portions of the shroud 102 during engine 10 operation.

Figure 3:
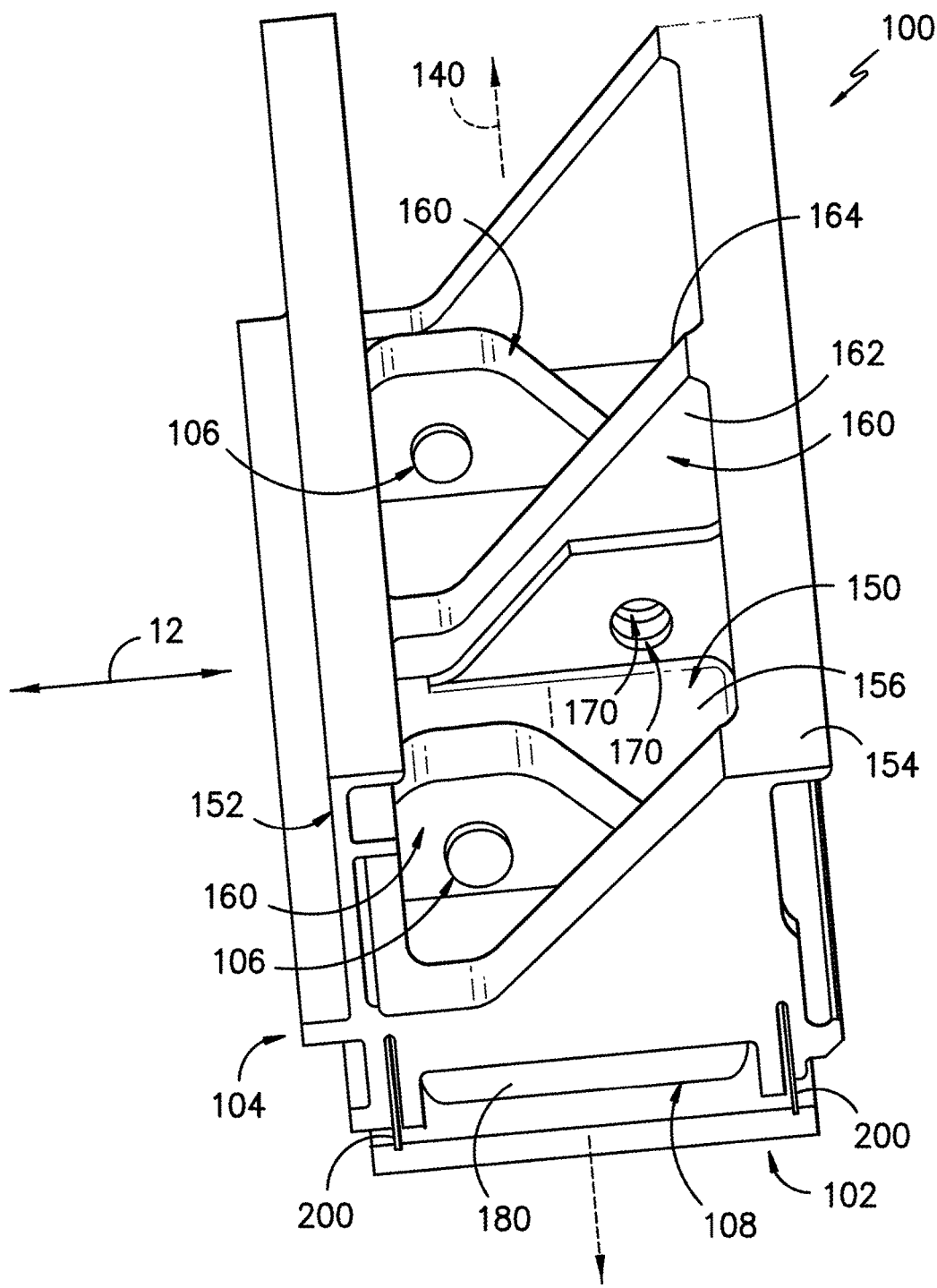
FIG. 3 is a top perspective view of a shroud assembly in accordance with one embodiment of the present disclosure.
Figure 4:
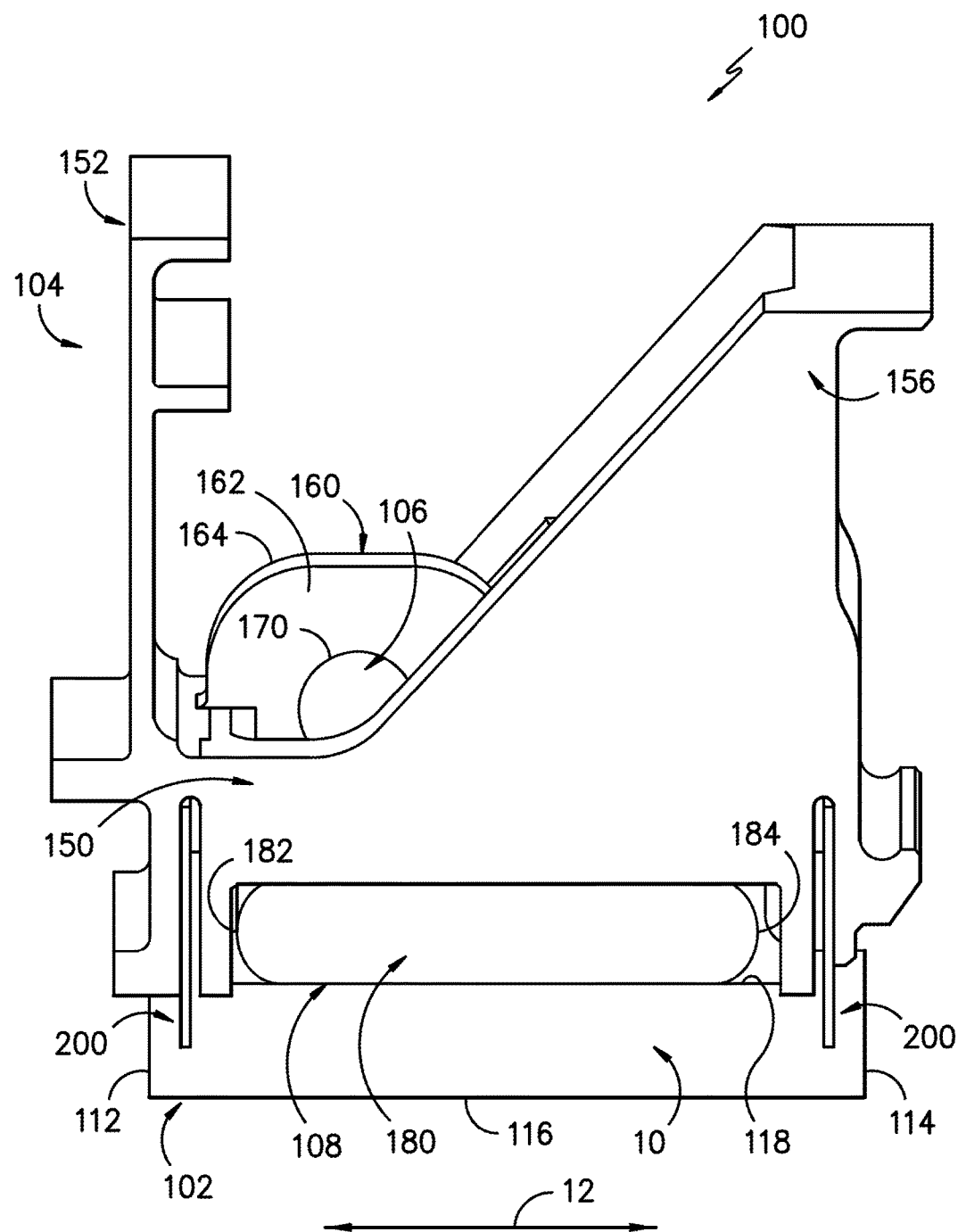
FIG. 4 is a side view of a shroud assembly in accordance with one embodiment of the present disclosure.

Referring now to FIGS. 3 and 4, shroud assembly 100 can further include a hanger 104. Hanger 104 generally is coupled to and supports the shroud 102 in the engine 10, and is itself supported by various other components in the engine 10. Hanger 104 may include a hanger body 150, and a forward hanger arm 152 and rear hanger arm 154 extending from the hanger body 150, such as radially outward (away from hot gas path 70) from the hanger body 150. Hanger body 150 may thus extend between the arms 152, 154. The rear arm 154 may be axially spaced from the forward arm 152, as shown.

Further, one or more flange housings 160 may extend from the hanger body 150, such as from an outer surface 156 thereof. When assembled, each flange housing 160 may generally accommodate a flange 120 of an associated shroud 102 therein, such that the flange 120 is generally disposed therein. Each flange housing 160 may be generally axially oriented, as shown. Further, one or more bore holes 170 may be defined in each flange housing 160, and each bore hole 170 may extend generally circumferentially through the flange housing 160. For example, the flange housing 160 may include a first wall 162 and a second wall 164, which may be side walls of the flange housing 160 between which a flange 120 may be disposed. A bore hole 170 may extend through a wall 162, 164. The second wall 164 may be generally circumferentially spaced from the first wall 162. In exemplary embodiments, a bore hole 170 may be defined in each wall 162, 164, and these bore holes 170 may be generally circumferentially aligned such that a pin can pass through both to couple a flange 120 thereto.

Similar to the shroud 102, the bore holes 170 of a hanger 104 may in some embodiments be aligned with the centerline 140, such that the centerline 140 generally passes through the center of the bore holes 170. In exemplary embodiments, however, one or more bore holes 170 may be axially offset from the centerline 140. For example, in some embodiments, a bore hole 170 may be axially offset towards the forward hanger arm 152, while in other embodiments a bore hole 170 may be axially offset towards the rear hanger arm 154. In particular exemplary embodiments wherein a plurality of flange housings 160 are utilized, as shown, each bore hole 170 of each flange housing 160 may be axially offset from the centerline 140. Further, in exemplary embodiments, at least one of more of the plurality of bore holes 170 is axially offset towards the forward hanger arm 152 and at least one or more of the plurality of bore holes 170 is axially offset towards the rear hanger arm 154. For example, the offsets of the generally circumferentially neighboring flange housings 160 may alternate between the forward offset and rear offset.

In expemlary embodiments, the hanger body 150, arms 152, 154, and flange housings 160 (and hanger 104 in general) may be formed from a metal, although in alternative embodiments the hanger body 150 and arms 152, 154, and flange housings 160 (and hanger 104 in general) may be formed from another suitable material such as a CMC material, etc. In particular, in exemplary embodiments, the hanger body 150, arms 152, 154, and flange housings 160 may be integral and thus generally a single component.

As further illustrated in FIGS. 3 and 4, shroud assembly 100 may further include one or more pins 106. When assembled, a pin 106 may extend generally circumferentially through a bore hole 170 and associated bore hole 130 to couple a flange 120 and flange housing 150 together.

Figure 6:
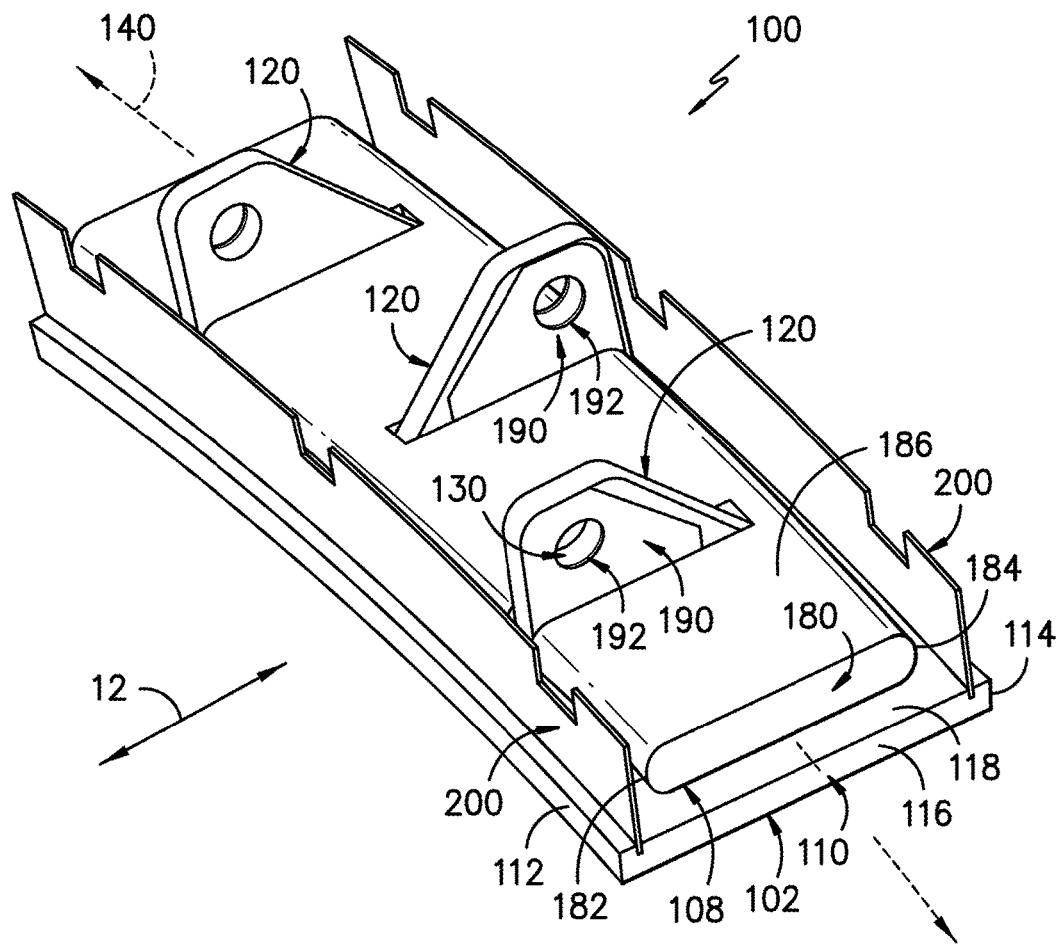
FIG. 6 is a perspective view of a shroud assembly, with a hanger of the shroud assembly removed for illustrative purposes, in accordance with one embodiment of the present disclosure.

Referring now to FIGS. 3, 4 and 6, shroud assembly 100 may further include a baffle 108. Baffle 108 may be disposed radially between the hanger 104 and the shroud 102 of a shroud assembly 100. Notably, the baffle 108 illustrated in FIGS. 3, 4 and 6 does not show various holes for cooling flow routing therein for cooling purposes.

Similar to the shroud 102 and hanger 103, baffle 108 may include a baffle body 180 and one or more flange plates 190 extending from the baffle body 180, such as from an outer surface 186 thereof. Each flange plate 190 may be generally axially oriented, as shown. Further, one or more bore holes 192 may be defined in each flange plate 190, and each bore hole 192 may extend generally circumferentially through the flange plate 190. When assembled, a flange housing 160 may generally accommodate one or more flange plates 190 along with a flange 120, such that the flange plate(s) 190 and flange 120 are generally disposed therein. Pin 106 may additionally extend through bore holes 192 to couple the flange plate(s) 190 to the flange 120 and flange housing 160.

Similar to the shroud 102 and the hanger 104, the bore holes 190 of a baffle 108 may in some embodiments be aligned with the centerline 140, such that the centerline 140 generally passes through the center of the bore holes 192. In exemplary embodiments, however, one or more bore holes 192 may be axially offset from the centerline 140. For example, in some embodiments, a bore hole 192 may be axially offset towards a forward surface 182 of the baffle 180, while in other embodiments a bore hole 170 may be axially offset towards a rear surface 184 of the baffle 180. In particular exemplary embodiments wherein a plurality of flange plates 190 are utilized, as shown, each bore hole 192 of each flange plate 190 may be axially offset from the centerline 140. Further, in exemplary embodiments, at least one or more of the plurality of bore holes 192 is axially offset towards the forward surface 182 and at least one or more of the plurality of bore holes 192 is axially offset towards the rear surface 184. For example, the offsets of the generally circumferentially neighboring flange plates 190 may alternate between the forward offset and rear offset.

In exemplary embodiments, the baffle body 180 and flange plates 190 (and baffle 108 in general) may be formed from a metal, although in alternative embodiments the baffle body 180 and flange plates 190 (and baffle 108 in general) may be formed from another suitable material such as a CMC material, etc. In particular, in exemplary embodiments, the baffle body 180 and flange plates 190 may be integral and thus generally a single component.

Additionally, in some embodiments, shroud assembly 100 may include one or more seal members 200. In the embodiments shown, leaf seals are utilized, although any other suitable seal members may be utilized in accordance with the present disclosure. A seal member 200 may extend between, and be partially disposed within, the hanger 104 and the shroud 102. A seal member 200 may further extend generally circumferentially along the shroud 102 and hanger 104. A seal member 200 may, for example, be disposed proximate the forward surface 112 and/or proximate the rear surface 114, as shown.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shroud assembly for a gas turbine engine, the shroud assembly comprising:
    a hanger, the hanger comprising a hanger body, a forward hanger arm and a rear hanger arm radially outward from the hanger body and spaced apart from each other, and a flange housing extending radially outward with respect to a turbine or compressor blade from an outer surface of the hanger body and located between the forward and the rear hanger arms, the hanger further comprising a bore hole of the hanger extending circumferentially through the flange housing between a first opening and a second opening;
    a shroud, the shroud comprising a shroud body and a flange extending from the shroud body, the shroud further comprising a bore hole of the shroud defined in the flange, the bore hole of the shroud extending circumferentially through the flange between a first shroud opening and a second shroud opening, the flange disposed within the flange housing; and
    a pin extending circumferentially through the bore hole of the hanger and the bore hole of the shroud.

2. The shroud assembly of claim 1, wherein the flange housing comprises a first wall and a second wall circumferentially spaced from the first wall, the bore hole of the hanger defined in one of the first wall or the second wall, the flange disposed between the first wall and the second wall.

3. The shroud assembly of claim 1, wherein the shroud assembly defines a circumferentially extending centerline, and wherein the bore hole of the hanger and the bore hole of the shroud are axially offset from the circumferentially extending centerline.

4. The shroud assembly of claim 1, wherein the flange housing is a plurality of flange housings, the bore hole of the hanger is a plurality of bore holes of the hanger, the flange is a plurality of flanges, and the bore hole of the shroud is a plurality of bore holes of the shroud, each of the plurality of bore holes of the hanger defined in one of the plurality of flange housings, and each of the plurality of bore holes of the shroud defined in one of the plurality of flanges.

5. The shroud assembly of claim 4, wherein the shroud assembly defines a circumferentially extending centerline, and wherein each of the plurality of bore holes of the hanger and each of the plurality of bore holes of the shroud is axially offset from the circumferentially extending centerline.

6. The shroud assembly of claim 5, wherein at least one of the plurality of bore holes of the hanger and one of the plurality of bore holes of the shroud are axially offset towards the forward hanger arm and at least one of the plurality of bore holes of the hanger and one of the plurality of bore holes of the shroud are axially offset towards the rear hanger arm.

7. The shroud assembly of claim 1, further comprising a baffle disposed radially between the hanger and the shroud, the baffle comprising a baffle body and a flange plate extending from the baffle body, the baffle further comprising a bore hole of the baffle defined in the flange plate, the bore hole of the baffle extending circumferentially through the flange plate between a first baffle opening and a second baffle opening, the flange plate disposed within the flange housing.

8. The shroud assembly of claim 7, wherein the baffle is formed from a metal.

9. The shroud assembly of claim 1, further comprising a seal member extending between the hanger and the shroud.

10. The shroud assembly of claim 1, wherein the shroud is formed from a ceramic matrix composite.

11. A gas turbine engine, comprising:
a compressor;
a combustion section;
a turbine; and
a shroud assembly disposed in one of the compressor or the turbine, the shroud assembly comprising:
a hanger, the hanger comprising a hanger body, a forward hanger arm and a rear hanger arm radially outward from the hanger body and spaced apart from each other, and a flange housing extending radially outward with respect to a turbine or compressor blade from an outer surface of the hanger body and located between the forward and the rear hanger arms, the hanger further comprising a bore hole of the hanger extending circumferentially through the flange housing between a first hanger opening and a second hanger opening;
a shroud, the shroud comprising a shroud body and a flange extending from the shroud body, the shroud further comprising a bore hole of the shroud defined in the flange, the bore hole extending circumferentially through the flange between a first shroud opening and a second shroud opening, the flange disposed within the flange housing; and
a pin extending circumferentially through the bore hole of the hanger and the bore hole of the shroud.

\* \* \* \* \*